C. A. ROBERTS.
TOP BOX FASTENER.
APPLICATION FILED SEPT. 1, 1914.
1,130,338.
Patented Mar. 2, 1915.
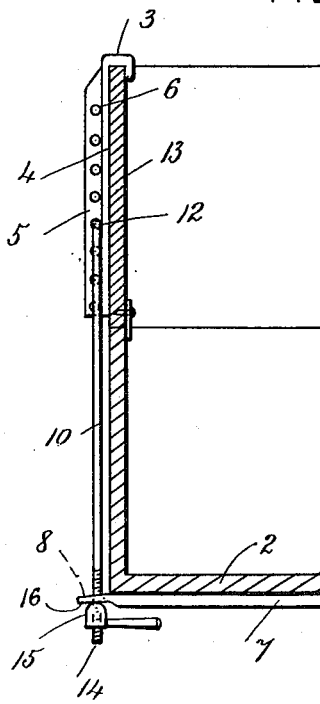
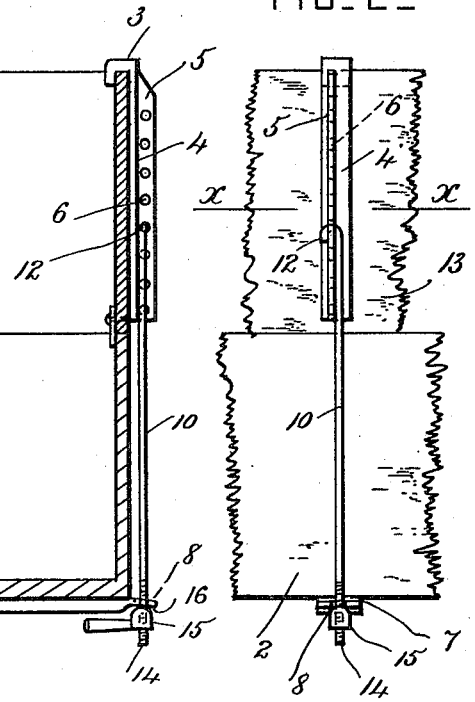
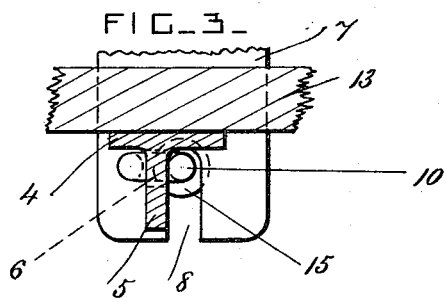
Witnesses
Wm H. Bates
Walter Allen
Inventor
Charles A. Roberts
By Herbert W. T. Jenner.
Attorney

UNITED STATES PATENT OFFICE.

CHARLES AMONS ROBERTS, OF RENSSELAER, INDIANA.

TOP-BOX FASTENER.

1,130,338.          Specification of Letters Patent.      Patented Mar. 2, 1915.

Application filed September 1, 1914. Serial No. 859,634.

*To all whom it may concern:*

Be it known that I, CHARLES A. ROBERTS, a citizen of the United States, residing at Rensselaer, in the county of Jasper and State of Indiana, have invented certain new and useful Improvements in Top-Box Fasteners; and I do hereby declare the following to be a full, clear, and exact description of the invention, such as will enable others skilled in the art to which it appertains to make and use the same.

This invention relates to fastening devices for securing extension boxes on the tops of wagon bodies; and it consists in the novel construction and combination of the parts hereinafter fully described and claimed.

In the drawings, Figure 1 is an end view of a wagon body provided with a top box and fasteners according to this invention. Fig. 2 is a side view of one of the fastening devices on one side of the wagon. Fig. 3 is a cross-section, taken on the line $x$—$x$ in Fig. 2.

The wagon body 2 is of any approved construction, and 13 is an ordinary top box which is placed on top of the wagon body temporarily for the purpose of increasing its capacity.

In order to secure the top box in place fastening devices are provided, and each fastening device has two hooks 3 which are hooked over the top edges of the top box. Each hook has a long shank 4 formed of a flat bar which bears against the side of the top box, and which has a laterally projecting rib or flange 5. This rib or flange has holes 6 arranged at short distances apart. The hook and its shank may be formed of cast malleable iron, or they may be forged from a piece of angle-iron. A crossbar 7 is arranged under the wagon body and has slots 8 formed in its end portions which project from under the wagon body. Rods 10 are provided and have hooks 12 at their upper ends for engaging with any of the holes 6. The lower end portions 14 of the rods are screwthreaded, and are provided with hand-nuts or thumb-nuts 15. The rods are slipped into the slots or openings 8, the hooks 12 being slipped into different holes 6 according to the height of the top box to be secured. The lower sides 16 of the end portions of the crossbar are beveled a little where the nuts bear against them, so that the nuts cannot slip laterally when screwed up to fasten the top box in place.

Fastening devices constructed in this manner are very simple and inexpensive, and they permit the top box to be removed and replaced as often as necessary, and with great facility.

What I claim is:

The combination, with a wagon body, and a top box; of hooks which engage with the top edge of the top box and which have shanks formed of flat bars arranged to bear on the sides of the top box and which are provided with laterally projecting ribs, said ribs each having a series of holes arranged one above another, a crossbar arranged under the wagon body and having openings in its end portions, rods having hooks for engaging with the holes in the lateral ribs and having screwthreaded end portions which project through the openings of the crossbar, and fastening nuts screwed on the rods under the crossbar.

In testimony whereof I have affixed my signature in the presence of two witnesses.

CHARLES AMONS ROBERTS.

Witnesses:
  W. I. SPITLER,
  E. M. LA RUE.

Copies of this patent may be obtained for five cents each, by addressing the "Commissioner of Patents, Washington, D. C."